US011969962B2

(12) United States Patent
Roberts et al.

(10) Patent No.: US 11,969,962 B2
(45) Date of Patent: Apr. 30, 2024

(54) METHOD FOR REPAIRING COMPOSITE COMPONENTS AND ASSOCIATED INFILTRATION SYSTEMS AND METHODS

(71) Applicant: General Electric Company, Schenectady, NY (US)

(72) Inventors: Herbert Chidsey Roberts, Middletown, OH (US); Timothy P. Coons, Cincinnati, OH (US); Gregory Willis, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 17/032,035

(22) Filed: Sep. 25, 2020

(65) Prior Publication Data

US 2022/0097325 A1 Mar. 31, 2022

(51) Int. Cl.
*B29C 73/02* (2006.01)
*B29C 73/12* (2006.01)
B29L 31/00 (2006.01)
F01D 5/28 (2006.01)

(52) U.S. Cl.
CPC ............ *B29C 73/025* (2013.01); *B29C 73/12* (2013.01); *B29L 2031/7504* (2013.01); *F01D 5/282* (2013.01)

(58) Field of Classification Search
CPC ................................................... B29C 73/025
See application file for complete search history.

(56) References Cited

U.S. PATENT DOCUMENTS

| | | | |
|---|---|---|---|
| 1,943,802 A | 1/1934 | Northrup | |
| 4,845,332 A | 7/1989 | Jancosek et al. | |
| 5,266,236 A | 11/1993 | Bovenkerk | |
| 6,820,334 B2 | 11/2004 | Kebbede et al. | |
| 8,884,201 B2 | 11/2014 | Matsen et al. | |
| 9,366,140 B2 | 6/2016 | Chamberlain | |
| 9,512,044 B2 | 12/2016 | Lazur et al. | |
| 9,527,170 B2 | 12/2016 | Czerner | |
| 9,573,853 B2 | 2/2017 | Lazur | |
| 9,598,321 B2 | 3/2017 | Lazur | |
| 10,087,110 B2 | 10/2018 | Sheedy et al. | |
| 10,150,708 B2 | 12/2018 | Shim et al. | |
| 2003/0196305 A1* | 10/2003 | Kebbede | C04B 35/653 29/402.09 |
| 2013/0022471 A1 | 1/2013 | Roberts, III et al. | |
| 2014/0272248 A1* | 9/2014 | Chamberlain | C04B 35/80 156/60 |
| 2015/0267359 A1* | 9/2015 | Berger | H05B 3/26 219/536 |
| 2015/0291473 A1 | 10/2015 | Schmidt | |

(Continued)

*Primary Examiner* — Philip C Tucker
*Assistant Examiner* — John Blades
(74) *Attorney, Agent, or Firm* — Dority & Manning, P.A.

(57) ABSTRACT

A method for repairing composite components includes positioning repair material within a repair region of a composite component formed of a composite material. Furthermore, the method includes heating the repair region to a first temperature. Additionally, the method includes heating a remaining portion of the composite component to a second temperature. Moreover, the method includes melt infiltrating the repair region with an infiltrant to densify the repair material. The first temperature is at or above a melting point of the infiltrant and the second temperature is less than the melting point.

5 Claims, 7 Drawing Sheets

(56) References Cited

U.S. PATENT DOCUMENTS

| | | |
|---|---|---|
| 2016/0175960 A1 | 6/2016 | Harris |
| 2018/0094525 A1 | 4/2018 | Roberts et al. |
| 2018/0111882 A1 | 4/2018 | Rateick, Jr. |
| 2019/0152828 A1* | 5/2019 | Kübler .................... G06F 3/041 |
| 2019/0255640 A1 | 8/2019 | Landwehr et al. |

* cited by examiner

METHOD FOR REPAIRING COMPOSITE COMPONENTS AND ASSOCIATED INFILTRATION SYSTEMS AND METHODS

FIELD

The present disclosure generally pertains to methods for repairing composite components, such as turbomachine components, and, more specifically, to methods for repairing composite components and associated infiltration systems and methods.

BACKGROUND

In recent years, the use of non-traditional high temperature materials, such as ceramic matrix composite (CMC) materials, in gas turbine engines has grown dramatically. Specifically, there is strong interest in replacing metal alloy components within the combustion and turbine sections of a gas turbine engine with CMC components. CMC materials can withstand higher operating temperatures than metal alloys. Higher operating temperatures, in turn, increase the efficiency of the gas turbine engine. Moreover, CMC components require less cooling than metallic components. Additionally, CMC materials are lighter than metallic components and may reduce the structural demands on the engine.

However, gas turbine components formed from CMC materials can be quite expensive. In this respect, when a CMC gas turbine component becomes worn or damaged, it is desirable to repair, rather than replace, the component. As such, methods of repairing CMC components have been developed. Specifically, the worn or damaged portion(s) of a CMC component may be removed and replaced with new CMC material. In such methods, the entire CMC component is heated to the melting temperature of its matrix material, thereby allowing the new CMC material to fuse with the existing CMC material. Such heating may, however, cause the matrix material of portions of the CMC component not being repaired to liquify and flow out of the component. Conversely, heating only the portion of the CMC component adjacent to the new CMC material to the melting point of the matrix material may result the formation of stress cracks within the component.

Accordingly, an improved method for repairing composite components would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for repairing composite components. The method includes positioning repair material within a repair region of a composite component formed of a composite material. Furthermore, the method includes heating the repair region to a first temperature. Additionally, the method includes heating a remaining portion of the composite component to a second temperature. Moreover, the method includes melt infiltrating the repair region with an infiltrant to densify the repair material. The first temperature is at or above a melting point of the infiltrant and the second temperature is less than the melting point.

In another aspect, the present subject matter is directed to a method of infiltrating composite components. The method includes heating a first portion of a composite component to a first temperature. Furthermore, the method includes heating a second portion of the composite component to a second temperature, with the second portion being adjacent to the first portion. Moreover, the method includes heating a third portion of the composite component to a third temperature. Additionally, the method includes melt infiltrating the composite component with an infiltrant to densify the first portion of the composite component. The first temperature is at or above a melting point of the infiltrant and the second and third temperatures are less than the melting point.

In a further aspect, the present subject matter is directed to a system for infiltrating composite components. The system includes a furnace defining a vacuum chamber and including a composite component holder positioned within the vacuum chamber, with the composite component holder configured to receive a composite component to be infiltrated with an infiltrant. Moreover, the system includes one or more heating elements positioned within the vacuum chamber. The one or more heating elements are, in turn, configured to heat a first portion of the composite component to a first temperature and heat a second portion of the composite component to a second temperature. The first temperature is at or above a melting point of the infiltrant and the second temperature is less than the melting point.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a method for repairing composite components and associated infiltration methods. In several embodiments, the disclosed methods may be used to repair various turbomachine components, such as ceramic matrix composite (CMC) gas turbine engine blades, vanes, shroud blocks, and/or the like. More specifically, during operation, a composite component may become worn or damaged. As such, in accordance with the disclosed methods, new composite material is formed in place of the worn/damaged portion of the composite component.

Additionally, the present subject matter is directed to a system for infiltrating composite components. Specifically, in several embodiments, the disclosed system includes a furnace defining a vacuum chamber configured to receive a composite component to be infiltrated with an infiltrant. Furthermore, in such embodiments, the system includes one or more heating elements positioned within the vacuum chamber. The heating element(s), in turn, are configured to heat a first portion of the composite component (e.g., a repair region of the component) to a first temperature at or above the melting point of the infiltrant. Moreover, the heating element(s) are configured to heat a second portion of the composite component (e.g., the remaining portion of the composite component) to a second temperature below the melting point of the infiltrant, but significantly above the ambient temperature.

In several embodiments, the disclosed methods may be implemented using the disclosed system. More specifically, in one embodiment, the method includes positioning repair material (e.g., fiber plies or a fiber preform) within a repair region of a composite component and placing component within the vacuum chamber. Additionally, the method includes heating the repair region to the first temperature using the one or more heating elements. Moreover, the method includes heating a remaining portion of the composite component to the second temperature using the heating element(s). Thereafter, the method includes melt infiltrating the repair region with the infiltrant to densify the repair material, thereby forming the new composite material within the repair region.

Heating the repair region to the first temperature and the remaining portion of the composite component to the second temperature provides one or more technical advantages. More specifically, as mentioned above, when repairing a composite component, it is necessary to heat repair region to the melting temperature of the infiltrant/matrix material to allow the new composite material to fuse with the existing composite material. However, heating the entire composite component to the infiltrant melting point may cause infiltrant in the remaining portion to liquify and flow out of the component. Moreover, heating only the repair region may result in the formation of stress cracks within the composite component due to the large thermal gradients existing between the repair region and the remaining portion. In this respect, heating the repair region to the first temperature allows the new composite material to fuse with the existing composite material. Furthermore, heating the remaining portion of the composite component to the second temperature allows the existing composite material within the remaining portion to remain solid, but with smaller thermal gradients between the repair region and the remaining portion such that stress cracks do not form.

Figure 1:
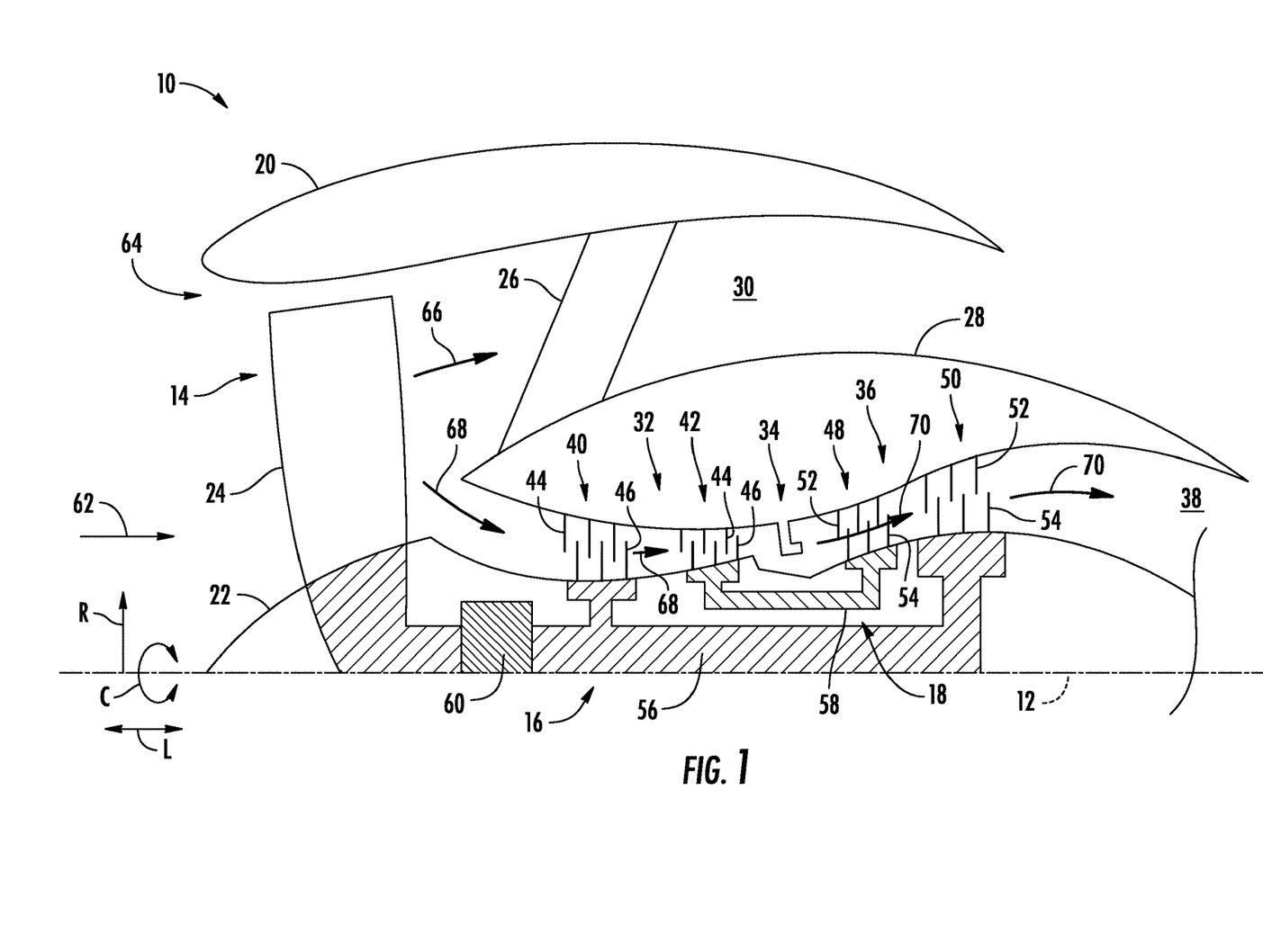
FIG. 1 is a schematic cross-sectional view of one embodiment of a gas turbine engine.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

Figure 2:
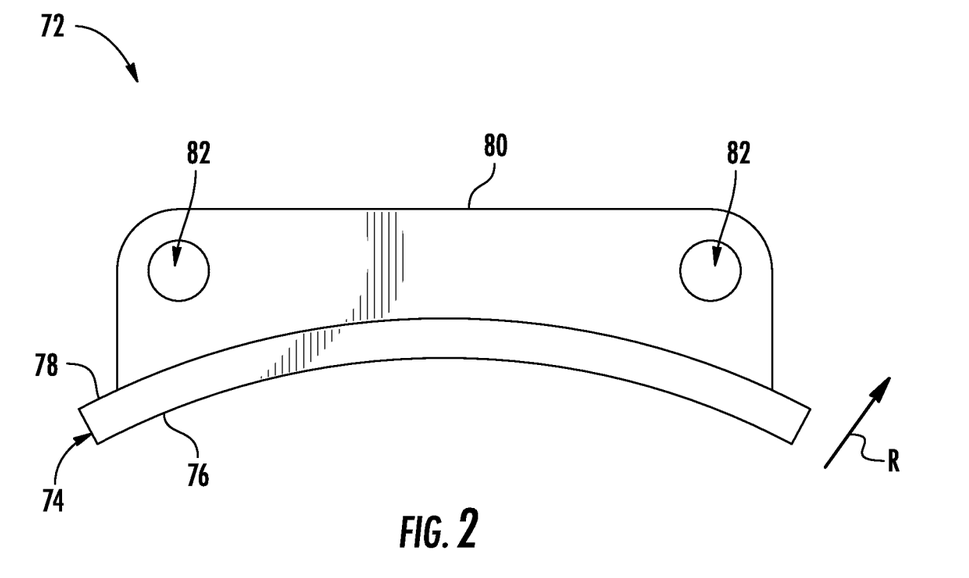
FIG. 2 is a side view of one embodiment of a shroud block of a gas turbine engine.

FIG. 2 is a side view of one embodiment of a shroud block 72 of the gas turbine engine 10. In general, several shroud blocks 72 are circumferentially arranged to form a shroud (not shown) enclosing or otherwise surrounding one of the rows of rotor blades 46 in the compressor section 32 or one of the rows of rotor blades 54 in the turbine section 36. As shown, the shroud block 72 includes an annular wall 74 extending between an inner surface 76 and an outer surface 78 in the radial direction R. The inner surface 76 is, in turn, positioned in close proximity to the tips of the corresponding blades 46, 54 to minimize the leakage of the air/combustion gases 68/70 past the blades 46, 54. Furthermore, the shroud 72 includes a pair of mounting rails 80 (one is shown). The rails 80 are spaced apart from each other in the longitudinal direction L and extend outward from the outer surface 78 of the annular wall 74 in the radial direction R. Moreover, each rail 80 defines a pair of mounting holes 82 for coupling the shroud block 72 to the outer casing 28 of the engine 10. However, in alternative embodiments, the shroud block 72 may have any other suitable configuration.

Additionally, one or more the components of the gas turbine engine 10 may be formed of a composite material, such as ceramic matrix composite (CMC) material. For example, in several embodiments, the compressor vanes 44, the compressor blades 46, the turbine vanes 52, the turbine blades 54, and shroud blocks 72 may be formed from CMC materials. However, in alternative embodiments, any other suitable components of the engine 10 may be formed by composite materials.

The configuration of the gas turbine engine 10 described above and shown in FIGS. 1 and 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
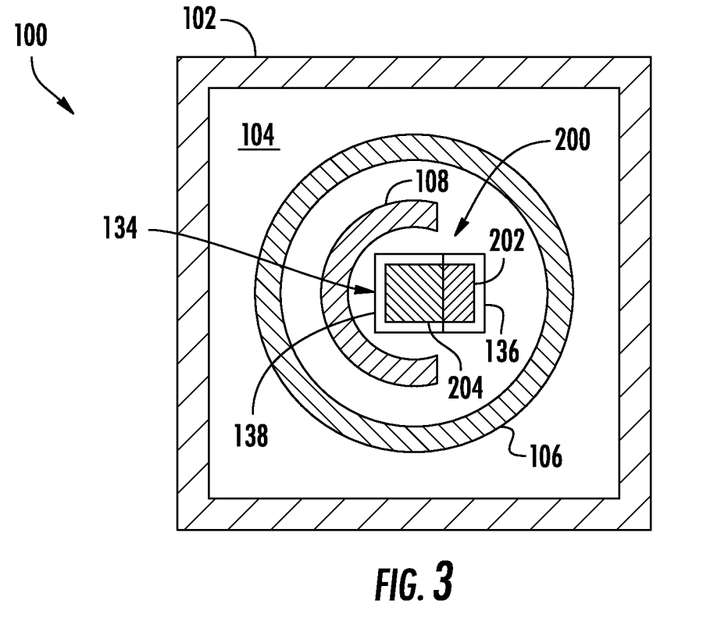
FIG. 3 is a cross-sectional view of one embodiment of a system for infiltrating composite components.

FIG. 3 is a cross-sectional view of one embodiment of a system 100 for infiltrating composite components. As shown, the system 100 includes a furnace 102 defining a vacuum chamber 104 therein. The vacuum chamber 104, in turn, is configured to receive a composite component 200 (or a precursor thereto, such as a fiber preform). Specifically, in several embodiments, a composite component holder 134 is positioned within the vacuum chamber 104 and configured to receive the composite component 200. As such, the composite component holder 134 may be any suitable structure for supporting the composite component 200 during heating and infiltration, such as a platform with a clamping mechanism(s). During operation of the furnace 102, the pressure within the vacuum chamber 104 may be below the ambient pressure (i.e., a vacuum is present within the chamber 104). In this respect, the furnace 102 may be configured to heat the component 200 while the component 200 is under a vacuum pressure.

In general, the furnace 102 includes one or more heating elements positioned within the vacuum chamber 104 to heat the component 200. Specifically, heating element(s) is configured to heat a first portion of the composite component 200, such as a repair region 202 of the component 200, to a first temperature (e.g., a temperature at or above the melting point of matrix material of the component 200). In several embodiments, the repair region 202 of the component 200 is positioned on a first portion 136 of the composite component holder 134 such that the first portion 136 and the repair region 202 are heated to the first temperature. Moreover, the heating element(s) is configured to heat a second portion of the composite component 200, such as a non-repair or remaining portion 204 of the component 200, to a different, second temperature (e.g., a lower temperature than the first temperature). In several embodiments, the remaining portion 204 of the component 200 is positioned on a second portion 138 of the composite component holder 134 such that the second portion 138 and the remaining portion 204 are heated to the second temperature. As such, in the illustrated embodiment, the furnace 102 includes a heating element 106 that surrounds or encloses the component 200. Furthermore, in the illustrated embodiment, the furnace 102 includes a shield 108 positioned between the heating element 106 and the remaining portion 204 of the component 200. In this respect, during operation, heat from the heating element 106 is directly transferred (e.g., via radiation) from the heating element 106 to the repair region 202 of the component 200 such that the repair region 202 is heated to the first temperature. Additionally, the shield 108 partially shields or otherwise reduces the amount of heat transferred (e.g., via radiation) from the heating element 108 to the remaining portion 204 of the component 200 such that the remaining portion 204 is heated to the second (e.g., lower) temperature.

Figure 4:
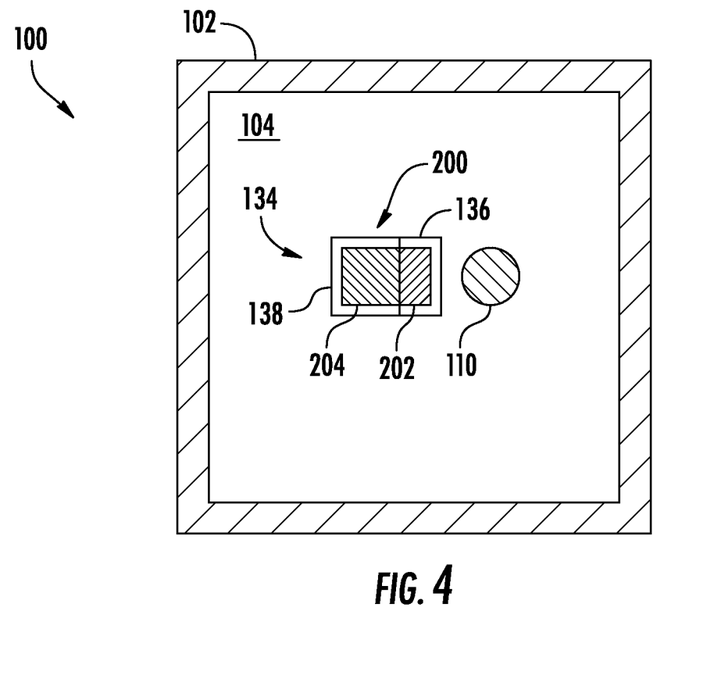
FIG. 4 is a cross-sectional view of another embodiment of a system for infiltrating composite components.

FIG. 4 is a cross-sectional view of another embodiment of a system 100 for infiltrating composite components. Like the embodiment of the system 100 shown in FIG. 3, the system 100 of FIG. 4 includes a furnace 102 defining a vacuum chamber 104 therein, with one or more heating elements positioned within the vacuum chamber 104. However, unlike the embodiment shown in FIG. 3, the system 100 of FIG. 3 includes a heating element 110. Specifically, during operation, the composite component 200 is positioned within the vacuum chamber 104 such that the heating element 110 is proximal to the repair region 202 and distal to the remaining portion 204. In this respect, the smaller distance between the heating element 110 and the first portion 202 allows the heating element 110 to heat the repair region 202 to the first temperature. Conversely, the greater distance between the heating element 110 and the remaining portion 204 allows the heating element 110 to heat the remaining portion 204 to the second (e.g., lower) temperature.

Figure 5:
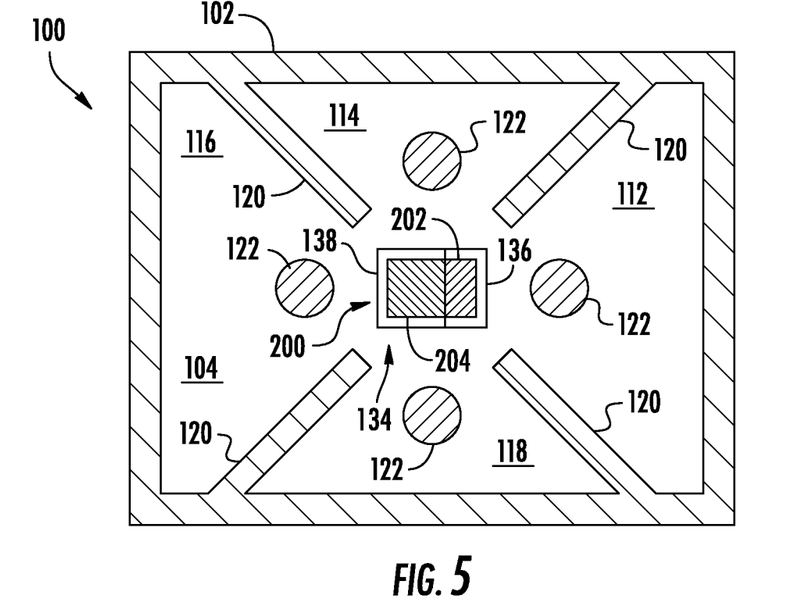
FIG. 5 is a cross-sectional view of a further embodiment of a system for infiltrating composite components.

FIG. 5 is a cross-sectional view of a further embodiment of a system 100 for infiltrating composite components. Like the embodiments of the system 100 shown in FIGS. 3 and 4, the system 100 of FIG. 5 includes a furnace 102 defining a vacuum chamber 104 therein, with one or more heating elements positioned within the vacuum chamber 104. However, unlike the embodiments shown in FIGS. 3 and 4, the vacuum chamber 104 of the system 100 shown in FIG. 5 includes a plurality of zones. More specifically, as shown, in one embodiment, the vacuum chamber 104 includes first, second, third, and fourth zones 112, 114, 116, 118. The zones 112, 114, 116, 118 are separated by baffles or walls 120 such that a portion of the component 200 is exposed to each zone 112, 114, 116, 118. For example, in the illustrated embodiment, the repair region 202 of the component 200 is exposed to the first zone 112 and the remaining portion 204 of the component 200 is exposed to the second, third, and fourth zones 114, 118, 120. Moreover, a heating element 122 is positioned within each zone 112, 114, 116, 118. In general, each heating element 122 is of the same type or a mix of heating sources (e.g., resistive carbon heating element, infrared heating lamp element, radio frequency induction coil heating, or on-off gassing heating sources). During operation, the heating element 122 within the zone 112 operates at a higher power output to heat the repair region 202 of the component 200 to the first temperature. Conversely, the heating elements 122 within the zones 114, 116, 118 operates at a lower power output to heat the remaining portion 204 of the component 200 to the second (e.g., lower) temperature. However, in alternative embodiments, the vacuum chamber 104 may include any other suitable number of zones and/or heating elements with each zone. Furthermore, the heating element(s) within each zone may be configured to heat the various portions of the component 200 to any other suitable manner.

Figure 6:
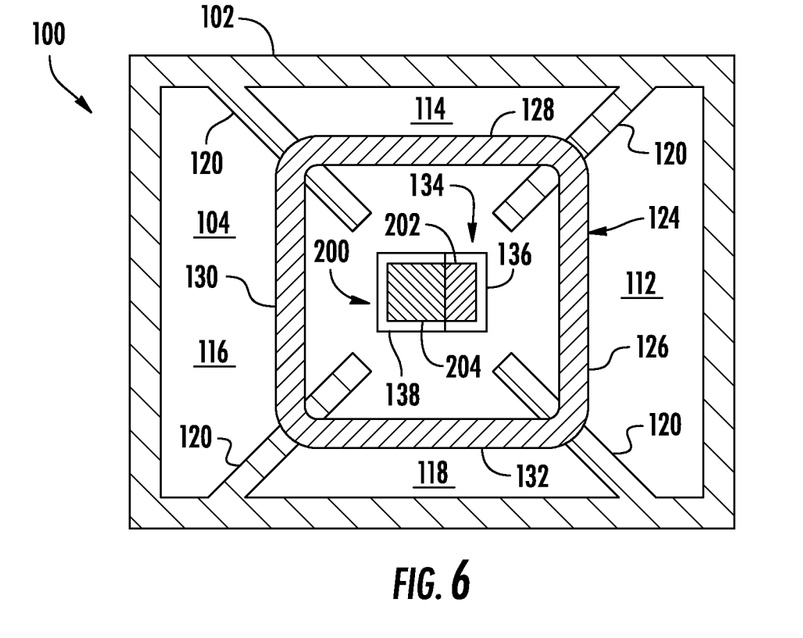
FIG. 6 is a cross-sectional view of yet another embodiment of a system for infiltrating composite components.

FIG. 6 is a cross-sectional view of yet another embodiment of a system 100 for infiltrating composite components. Like the embodiments of the system 100 shown in FIG. 5, the system 100 of FIG. 6 includes a furnace 102 defining a vacuum chamber 104 therein, with the vacuum chamber 104 including a plurality of zones 112, 114, 116, 118. However, unlike the embodiments shown in FIG. 5, the vacuum chamber 104 of the system 100 of FIG. 6 includes a single heating element 124 extending through each of the zones 112, 114, 116, 118. In this respect, first, second, third, and fourth portions 126, 128, 130, 132 of the heating element 124 are respectively positioned within the first, second, third, and fourth zones 112, 114, 116, 118. Thus, during operation, the first portion 126 of the heating element 124 operates at a higher power output to heat the repair region 202 of the component 200 to the first temperature. Conversely, the second, third, and fourth portions 128, 130, 132 of the heating element 124 operates at a higher power output to heat the remaining portion 204 of the component 200 to the second (e.g., lower) temperature. For example, in such instances, electric current may flow through the first portion 126 of the heating element 124 before flowing through the second, third, and fourth portions 128, 130, 132 of the heating element 124. As such, the first portion 126 of the heating element 124 may receive a higher voltage than the second, third, and fourth portions 128, 130, 132 of the heating element 124.

The heating elements 106, 110, 122, 124 described above may correspond to any suitable type of device for generating heat that can be transferred via radiation to the composite component 200. For example, in several embodiments, the heating elements 106, 110, 122, 124 are resistive carbon heating elements. In such embodiments, when electric current is supplied to the heating elements 106, 110, 122, 124, the internal electrical resistance of the carbon generates heat that can be via radiation to the component 200. In other embodiments, an infrared heating lamp element generates heat that can heat component 200 via radiation or a radio frequency induction coil can heat component 200 through inductive electrical fields.

Additionally, the heating elements 106, 110, 122, 124 described above may heat the composite component 200 in any other suitable manner. For example, in one embodiment, the heating elements 106, 110, 122, 124 may be configured to heat three or more different portions of the component 200 to three or more different temperatures.

The configurations of the system 100 described above and shown in FIG. 3-6 is provided only to place the present subject matter in an exemplary field of use. Thus, the present subject matter may be readily adaptable to any manner of system for infiltrating composite components.

Figure 7:
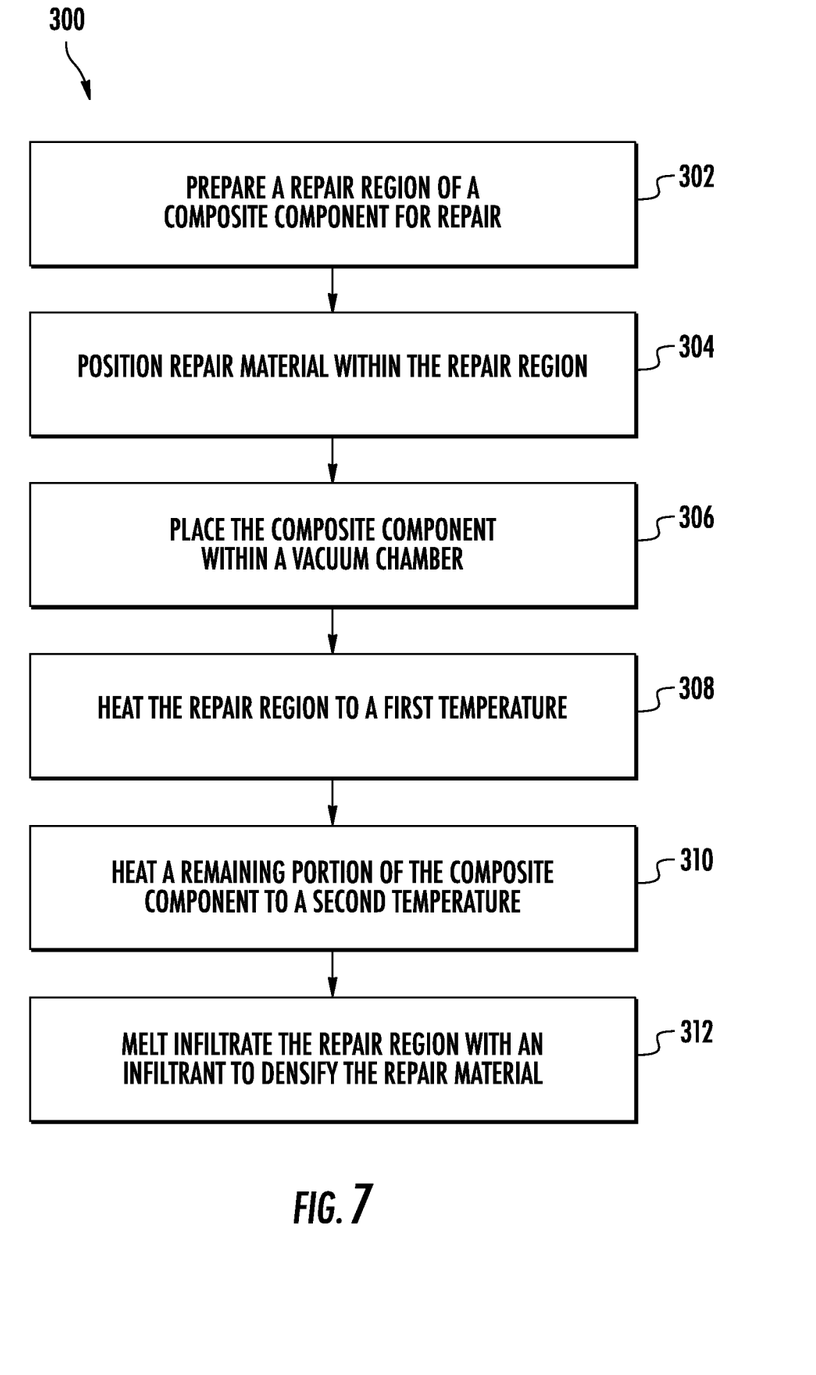
FIG. 7 is a flow diagram of one embodiment of a method for repairing composite components.

FIG. 7 is a flow diagram of one embodiment of a method 300 for repairing composite components. Although FIG. 7 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

In general, the various steps of the method 300 will be described below in the context of repairing a composite component 200. For example, as will be described below, the composite component 200 may correspond to a composite component of the gas turbine engine 10. For example, in some embodiments, the composite component 200 may correspond to a compressor vane(s) 44, a compressor blade(s) 46, a turbine vane(s) 52, a turbine blade(s) 54, and/or a shroud block(s) 72 of the engine 10. However, in alternative embodiments, the composite component 200 may correspond to any other suitable composite component.

Figure 8:
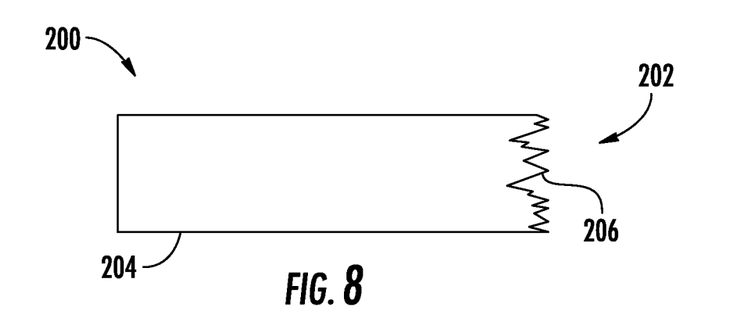
FIG. 8 is a top view of one embodiment of a composite component, particularly illustrating the component prior to repair.

FIG. 8 is a perspective view of one embodiment of the composite component 200. As shown, the composite component 200 includes a repair region 202 and a remaining portion 204. More specifically, the repair region 202 corresponds to a portion of the component 200 that will be repaired in accordance with the methods disclosed herein. As such, the repair region 202 is portion of the component 200 that will be replaced with new composite material. The remaining portion 204 is the portion of the component 200 not being repaired. Although the component 200 shown in FIG. 1 only includes one repair region 202, the component 200 may, in other embodiments, include any other suitable number of repair regions 202.

Moreover, the composite component 200 may be formed from any suitable composite material. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC matrix is ceramic powder, including but not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a MMC matrix material include, but are not limited to powder metals such as, but not limited to, aluminum or titanium capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load caring element. For example, in one embodiment, the composite component 200 may be formed from a silicon carbide-silicon carbide (SiC—SiC) matrix composite.

Figure 9:
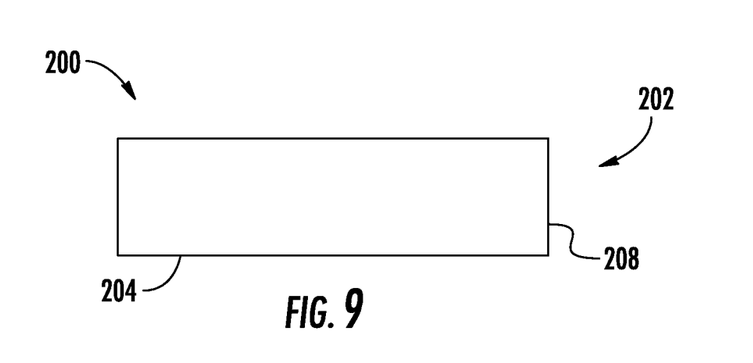
FIG. 9 is top view of the composite component shown in FIG. 8, particularly illustrating a repair region of the component after preparation for repair.

Referring again to FIG. 7, at (302), the method 300 includes preparing a repair region of a composite component for repair. Specifically, in several embodiments, at (302), the worn or damaged material within the repair region 202 that has not already broken off or separated from remaining portion 204 of the composite component 200 may be removed from the component 200 via machining, grinding, cutting, and/or the like. For example, in certain instances, as shown in FIG. 4, the repair region 202 may include an irregular surface 206 unsuitable for joining to the new composite material. In such instances, at (302), material from the component 200 may be removed to form a suitable repair interface 208. The repair interface 208 is, in turn, the surface of the component 200 to which the new composite material will be joined. As shown in FIG. 9, upon completion of (302), the worn/damaged material of the repair region 202 has been removed and the repair interface 208 has been formed.

Figure 10:
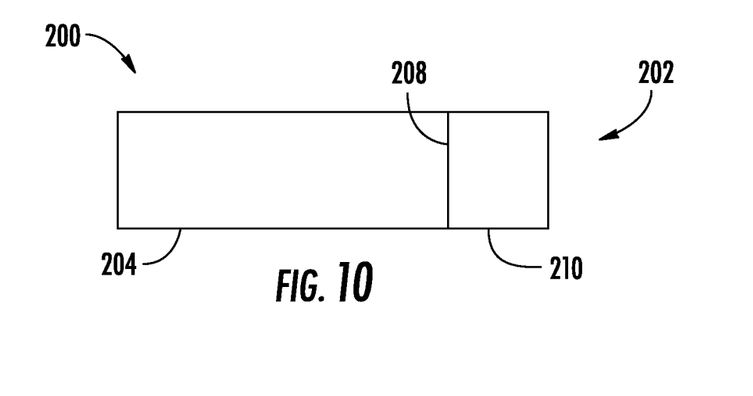
FIG. 10 is a top view of the composite component shown in FIGS. 8 and 9, particularly illustrating repair material positioned within the repair region.

Additionally, as shown in FIG. 7, after preparing the repair region, at (304), the method 300 includes positioning repair material within the repair region. For example, as shown in FIG. 10, repair material 210 is positioned within the repair region 202 such that repair material 210 is in contact with the repair interface 208. In this respect, the repair material 210 occupies the space where the worn/damaged material was originally present. As will be described below, the repair material 210 will be melt infiltrated within an infiltrant to densify the repair material 210 such that new composite material is formed in the repair region 202, thereby repairing the component 200.

In general, the repair material 210 corresponds to a precursor material for the composite material from which the component 200 is formed. As such, the repair material 210 may include a plurality of fibers defining voids that receive the infiltrant. For example, in embodiments in which the component 200 is formed from a SiC—SiC matrix composite, the repair material 210 may correspond to a silicon carbide (SiC) fiber preform having the same shape and size as the void left in the repair region 202. In such embodiments, the infiltrant may correspond to silicon. However, in alternative embodiments, the repair material 210 may correspond to any other suitable composite precursor material, such as a fiber preform formed of another suitable material, fiber tapes, fiber mats, fiber plies, and the like.

Furthermore, as shown in FIG. 7, at (306), the method 300 includes placing the composite material within a vacuum chamber. For example, after positioning the repair material 210 within the repair region 202, the composite component 200 may be placed within the vacuum chamber 104 of the furnace 102.

Moreover, at (308), the method 300 includes heating the repair region to a first temperature. For example, one or more heating elements within the vacuum chamber 104 (e.g., any of the heating elements 106, 110, 122, 124) may heat the repair region 202 of the composite component 200 to a first temperature at or above the melting point of the infiltrant that will densify the repair material 210 (i.e., the matrix material). In several embodiments, the flow of electric current to the heating element(s) within the vacuum chamber 104 may be controlled (e.g., by an operator or a suitable controller/computing system) such that the heating element(s) heat the repair region 202 to the first temperature.

In addition, as shown in FIG. 7, at (310), the method 300 includes heating a remaining portion of the composite component to a second temperature. For example, the heating element(s) within the vacuum chamber 104 (e.g., any of the heating elements 106, 110, 122, 124) may heat the remaining portion 204 of the composite component 200 to a second temperature. The second temperature, in turn, is less than the melting point of the infiltrant that will densify the repair material 210 (i.e., the matrix material), but substantially greater than the ambient temperature. For example, the second temperature may be less than five hundred degrees Fahrenheit below than the infiltrant melting point, such as less than 250 degrees Fahrenheit or less than one hundred degrees Fahrenheit. In some embodiments, the flow of electric current to the heating element(s) within the vacuum chamber 104 may be controlled (e.g., by an operator or a suitable controller/computing system) such that the heating element(s) heat the remaining portion 204 to the second temperature.

Heating the repair region 202 to the first temperature and the remaining portion 204 of the composite component 200 to the second temperature provides one or more technical advantages. More specifically, heating the repair region 202 to the first temperature (i.e., a temperature at or above the melting point of the infiltrant/matrix material) allows the new composite material formed from the repair material 210 within the repair region 202 to fuse with the existing composite material of the component 200. Furthermore, heating the remaining portion 204 of the composite component 200 to the second temperature (i.e., a temperature below the melting point of the infiltrant/matrix material, but substantially above the ambient temperature) allows the existing composite material within the remaining portion 204 to remain solid. Moreover, such heating results in smaller thermal gradients between the repair region 202 and the remaining portion 204 such that stress cracks do not form.

Further, after heating the repair region to the first temperature and the remaining portion to the second temperature, at (312), the method 300 includes melt infiltrating the repair region with an infiltrant to densify the repair material. For example, after the repair region 202 is heated to the first temperature and the remaining portion 204 is heated to the second temperature, the repair material 210 is melt infiltrated with a suitable infiltrant (e.g., molten silicon).

Figure 11:
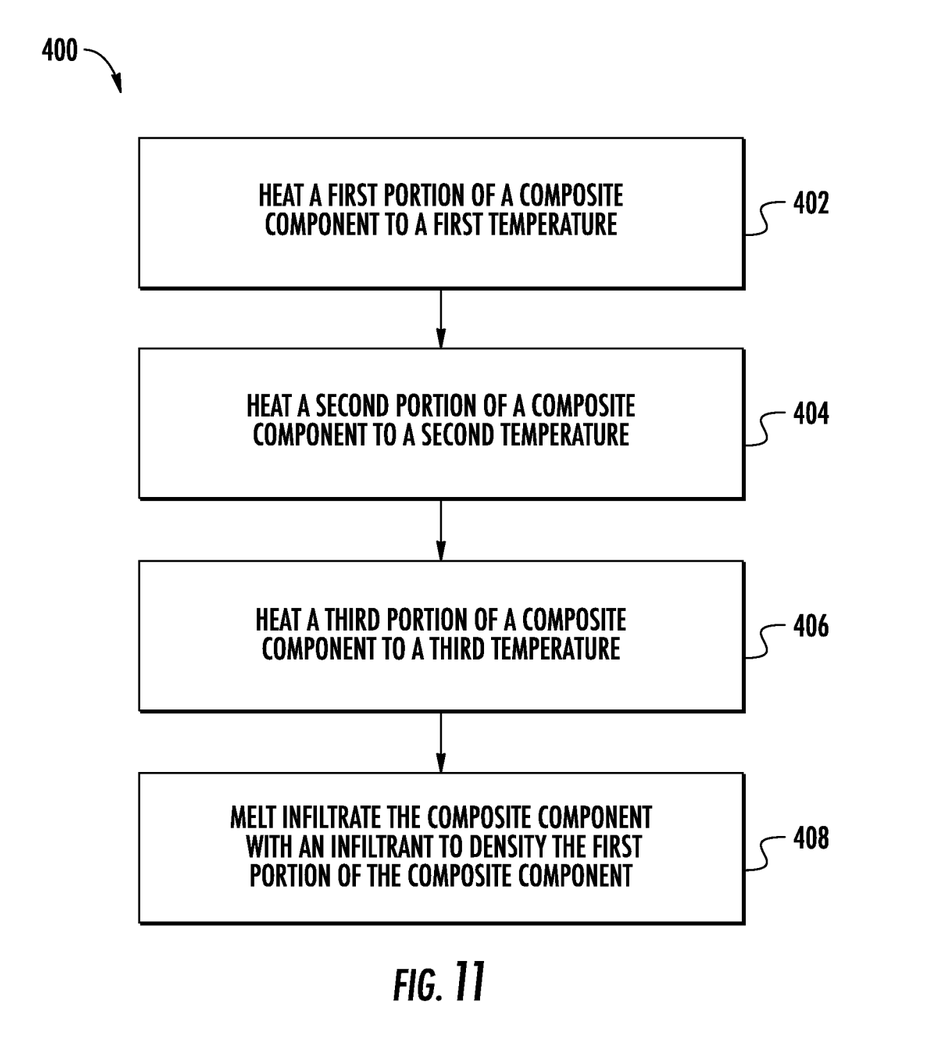
FIG. 11 is a flow diagram of one embodiment of a method for infiltrating composite components.

FIG. 11 is a flow diagram of one embodiment of a method 400 for infiltrating composite components. Although FIG. 11 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

As shown in FIG. 11, at (402), the method 400 may include heating a first portion of a composite component to a first temperature. For example, as described above, one or more heating elements within the vacuum chamber 104 (e.g., any of the heating elements 106, 110, 122, 124) may heat the repair region 202 of the composite component 200 to a first temperature at or above the melting point of the infiltrant that will densify the repair material 210 (i.e., the matrix material).

Additionally, at (404), the method 400 includes heating a second portion of the composite component to a second temperature. For example, the heating element(s) within the vacuum chamber 104 (e.g., any of the heating elements 106, 110, 122, 124) may heat a first section of the remaining portion 204 of the composite component 200 to a second temperature.

Furthermore, at (406), the method 400 includes heating a third portion of the composite component to a third temperature. For example, the heating element(s) within the vacuum chamber 104 (e.g., any of the heating elements 106, 110, 122, 124) may heat a second section of the remaining portion 204 of the composite component 200 to a third temperature. The third temperature is generally below the melting point of infiltrant and may be the different than the second temperature.

Moreover, after heating the repair region to the first temperature and the remaining portion to the second temperature, at (408), the method 400 includes melt infiltrating the composite component with an infiltrant to densify the first portion of the composite component. For example, after the repair region 202 is heated to the first temperature and the remaining portion 204 is heated to the second temperature, the repair material 210 is melt infiltrated with a suitable infiltrant (e.g., molten silicon).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for repairing composite components, the method comprising: positioning repair material within a repair region of a composite component formed of a composite material; heating the repair region to a first temperature; heating a remaining portion of the composite component to a second temperature; and melt infiltrating the repair region with an infiltrant to densify the repair material, wherein the first temperature is at or above a melting point of the infiltrant and the second temperature is less than the melting point.

The method of one or more of these clauses, wherein: heating the repair region comprises heating the repair region to the first temperature using a heating element surrounding the composite component; and heating the remaining portion comprises partially shielding the remaining portion from the heating element such that the heating element heats the remaining portion to the second temperature.

The method of one or more of these clauses, wherein: heating the repair region comprises heating the repair region to the first temperature using a heating element; and heating the remaining portion comprises heating the remaining portion to the second temperature using the heating element, the heating element being positioned proximal to the repair region and distal to the remaining portion.

The method of one or more of these clauses, wherein: heating the repair region comprises heating the repair region to the first temperature using a first heating element; and heating the remaining portion comprises heating the remaining portion to the second temperature using a second heating element, the first and second heating elements being of a type of heating element.

The method of one or more of these clauses, wherein: heating the repair region comprises heating the repair region to the first temperature using a first section of a heating element; and heating the remaining portion comprises heating the remaining portion to the second temperature using a second section of the heating element.

The method of one or more of these clauses, further comprising: placing the composite component within a vacuum chamber before heating the repair region and heating the remaining portion.

The method of one or more of these clauses, wherein heating the repair region comprises heating the repair region to the first temperature using a carbon heating element.

The method of one or more of these clauses, wherein the repair material comprises silicon carbide and the infiltrant comprises silicon.

The method of one or more of these clauses, wherein: heating the repair region comprises controlling a flow of electric current to one or more heating elements such that the one or more heating elements heat repair region to the first temperature; and heating a remaining portion of the composite component comprises controlling the flow of electric current to the one or more heating elements such that the one or more heating elements heat remaining portion to the second temperature.

A method of infiltrating composite components, the method comprising: a heating a first portion of a composite component to a first temperature; heating a second portion of the composite component to a second temperature, the second portion being adjacent to the first portion; heating a third portion of the composite component to a third temperature; and melt infiltrating the composite component with an infiltrant to densify the first portion of the composite component, wherein the first temperature is at or above a melting point of the infiltrant and the second and third temperatures are less than the melting point.

The method of one or more of these clauses, wherein: heating the first portion comprises heating the first portion to the first temperature using a heating element surrounding the composite component; and heating the second portion comprises partially shielding the second portion from the heating element such that the heating element heats the second portion to the second temperature.

The method of one or more of these clauses, wherein: heating the first portion comprises heating the first portion to the first temperature using a heating element; and heating the second portion comprises heating the second portion to the second temperature using the heating element, the heating element being positioned proximal to the first portion and distal to the second portion.

The method of one or more of these clauses, wherein: heating the first portion comprises heating the first portion to the first temperature using a first heating element; and heating the second portion comprises heating the second portion to the second temperature using a second heating element, the first and second heating elements being of a type of heating element.

A system for infiltrating composite components, the system comprising: a furnace defining a vacuum chamber and including a composite component holder positioned within the vacuum chamber, the composite component holder configured to receive a composite component to be infiltrated with an infiltrant; and one or more heating elements positioned within the vacuum chamber, the one or more heating elements configured to heat a first portion of the composite component to a first temperature and heat a second portion of the composite component to a second temperature, wherein the first temperature is at or above a melting point of the infiltrant and the second temperature is less than the melting point.

The system of one or more of these clauses, wherein the one or more heating elements include a first heating element that surrounds the composite component, the system further comprising: a shield positioned between the first heating element and the second portion to reduce a transfer of heat from the first heating element to the second portion such that the first heating element heats the first portion to the first temperature and the second portion to the second temperature.

The system of one or more of these clauses, wherein the one or more heating elements include a first heating element positioned proximal to the first portion and distal to the second portion such that the first heating element heats the first portion to the first temperature and the second portion to the second temperature.

The system of one or more of these clauses, wherein the one or more heating elements include a first heating element configured to heat first portion to the first temperature and a second heating element configured to heat the second portion to the second temperature.

The system of one or more of these clauses, wherein the first and second heating elements are of a same type of heating element.

The system of one or more of these clauses, wherein the one or more heating elements include a first heating element having a first section and a second section, the first section configured to heat the first portion of the composite component to the first temperature and the second section configured to heat the second portion of the composite component to the second temperature.

The system of one or more of these clauses, wherein the one or more heating elements comprises one or more carbon heating elements.

What is claimed is:

1. A method for repairing composite components, the method comprising:
    positioning repair material within a repair region of a composite component formed of a composite material;
    placing the composite component within a vacuum chamber such that the repair region is exposed to a first zone of the vacuum chamber and a remaining portion of the composite component is at least partially exposed to a second zone of the vacuum chamber that is separated from the first zone of the vacuum chamber by a wall;
    controlling an operation of a first heating element positioned within the first zone of the vacuum chamber to heat the repair region to a first temperature;
    controlling an operation of a second heating element positioned within the second zone of the vacuum chamber to heat the remaining portion of the composite component to a second temperature; and
    melt infiltrating the repair region with an infiltrant to densify the repair material,
    wherein the first temperature is at or above a melting point of the infiltrant and the second temperature is less than the melting point.

2. The method of claim 1, wherein
the first heating element and the second heating element are of a same type of heating element.

3. The method of claim 1, wherein the first heating element comprises a first carbon heating element and the second heating element comprises a second carbon heating element.

4. The method of claim 1, wherein the repair material comprises silicon carbide and the infiltrant comprises silicon.

5. The method of claim 1, wherein:
    controlling the operation of the first heating element comprises controlling a flow of electric current to the first heating element to heat the repair region to the first temperature; and
    controlling the operation of the second heating element comprises controlling the flow of electric current to the second heating element to heat the remaining portion of the composite component to the second temperature.

* * * * *